United States Patent
Cochran et al.

[15] 3,698,320
[45] Oct. 17, 1972

[54] TELESCOPIC ROCKET

[72] Inventors: David L. Cochran, Danville; Arthur L. Deleray, Pleasanton; John P. Lehman, Alamo, all of Calif.

[73] Assignee: M B Associates, San Ramon, Calif.

[22] Filed: July 29, 1970

[21] Appl. No.: 59,253

[52] U.S. Cl. ............102/49.3, 89/1.806, 89/1.817, 102/34.4
[51] Int. Cl. .............................................F42b 15/00
[58] Field of Search ..244/3.3, 3.76; 89/1.818, 1.807, 89/1.806, 1.5 R; 102/34.4, 49.1, 49.2, 49.3, 34

[56] References Cited

UNITED STATES PATENTS

| | | | |
|---|---|---|---|
| 3,179,052 | 4/1965 | Jasse | 244/3.28 |
| 1,049,144 | 12/1912 | Quisling | 244/3.3 X |
| 2,344,957 | 3/1944 | Anzalone | 244/3.26 |
| 2,409,904 | 10/1946 | Schermuly et al. | 244/3.3 X |
| 2,792,756 | 5/1957 | Schneiter | 89/1.806 |
| 3,137,203 | 6/1964 | Brown | 89/1.818 |
| 3,049,080 | 8/1962 | Schermuly | 102/34.4 |
| 2,426,239 | 8/1947 | Renner | 244/3.3 X |
| 3,137,131 | 6/1964 | Johnson | 102/34.4 |
| 3,430,533 | 3/1969 | Kifor et al. | 89/1.5 R |

*Primary Examiner*—Samuel W. Engle
*Attorney*—Harness, Dickey & Pierce

[57] ABSTRACT

A safety device comprising a rocket having a body of cylindrical form and an ogive head over which a sleeve is slidably disposed in nested relation for storage. Upon initial movement of the rocket, the sleeve slides rearwardly so as to extend from the rear end thereof. If the rocket is directed outwardly into the relative airstream of an airplane, a javelin effect is produced so as to stabilize the rocket for travel in the direction of the airplane. If the rocket is directed upwardly from the ground by means of a hand-held launcher or other fixed launcher, the telescoping rear sleeve will cause the rocket to stabilize in flight.

2 Claims, 7 Drawing Figures

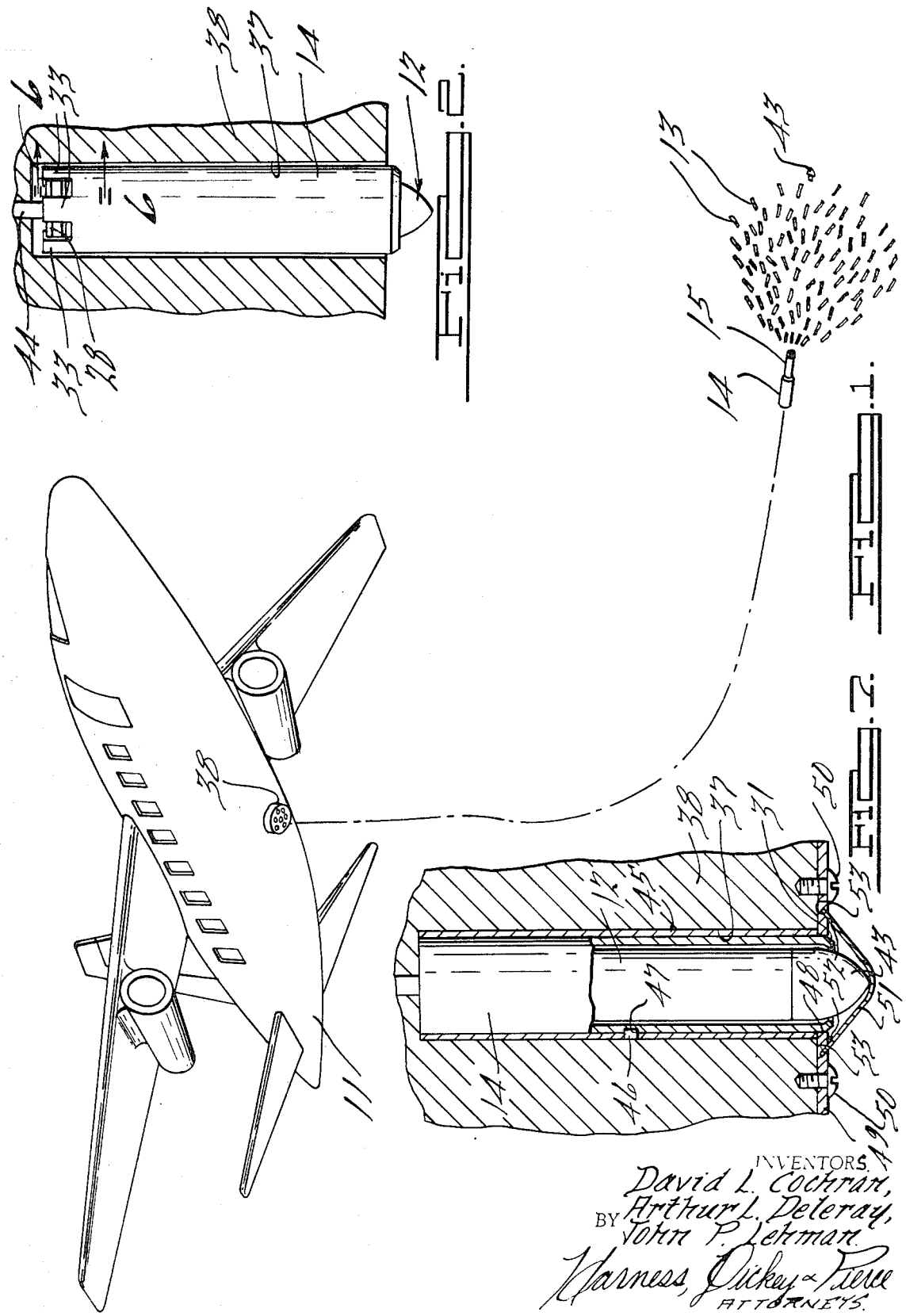

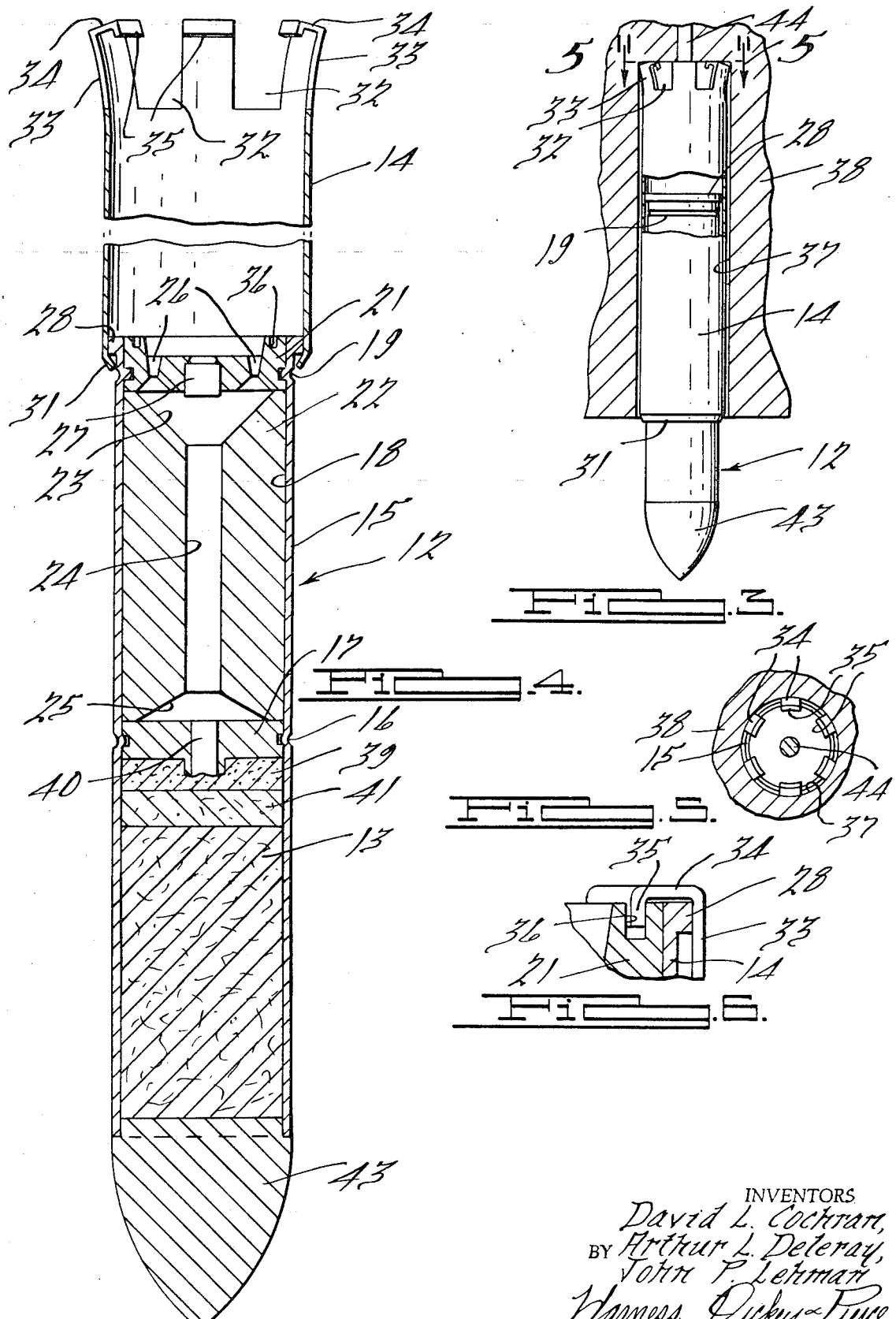

3,698,320

TELESCOPIC ROCKET

BACKGROUND OF THE INVENTION

Reference may be had to U.S. Pat. No. 3,378,944 to disclose a pistol for firing a rocket having a motor similar to that of the rocket of the present invention.

SUMMARY OF THE INVENTION

The present invention may be utilized as a rocket with a safety device, e.g., a flare that will burst in an area ahead of a descending aircraft to light an area for emergency landing. The rocket may be contained in a canister which is housed internally of the airplane.

A sleeve on the body of the rocket is retained in the cannister or launcher as the rocket advances until a flange at its forward end engages the rearward end of the rocket whereby the sleeve is disposed as a relatively lightweight rear extension of the rocket. As the rocket with the extending sleeve moves outwardly away from the aircraft, the relative airstream biases the sleeve rearwardly about the center of gravity of the rocket. The speed of the rocket will rapidly increase and the rocket will advance a substantial distance ahead of the airplane before the charge, for example, a flare, is ignited. A time fuse may be located between the motor propellent and the charge and is ignited at a predetermined time after the propellant is ignited. At this time the rocket will be located, for example, several thousand feet ahead of the airplane, depending upon the rocket motor design, and the speed and height at which the airplane is traveling. The sleeve is held with shear pins or a spring-type device to the launch tube to restrain movement thereof until the rocket motor picks up the sleeve by engaging the forward end as described above.

BRIEF DESCRIPTION OF THE DRAWINGS

FIG. 1 is a perspective view of a flying airplane with a path of a rocket fired therefrom as an example of the several uses of the telescopic rocket;

FIG. 2 is a section view of a canister showing a rocket within a retracted sleeve within a chamber therein;

FIG. 3 is a view of the structure illustrated in FIG. 2 showing the projectile of the rocket advancing within the sleeve immediately after ignition;

FIG. 4 is an enlarged sectional view of the rocket and sleeve with the sleeve shown in extended position;

FIG. 5 is a sectional view of the structure illustrated in FIG. 3, taken on the line 5—5 thereof;

FIG. 6 is an enlarged broken sectional view of the structure illustrated in FIG. 2, taken on the line 6—6 thereof, and FIG. 7 is a view of structure, similar to that illustrated in FIG. 2, showing a further form of the invention.

DESCRIPTION OF THE PREFERRED EMBODIMENT

In FIG. 1, an airplane 11 is illustrated in flight, showing a rocket 12 approximately at the end of its flight when it was exploded to fill the air with the payload 13 quite some distance ahead of the plane. The rocket has a sleeve 14 telescoped thereover before the rocket motor is ignited but which is retained within the rocket chamber as the rocket advances. The slipstream below the plane produces a javelin effect to tip the sleeve to the rear about the center of gravity of the rocket thereby directing the rocket in the line of flight of the plane so that it is free to move ahead of the plane in its flight. The speed of movement of the rocket and sleeve through the air depends upon the design of the rocket motor, and the speed and altitude of the plane so that the point of delivery of the payload ahead of the plane may be varied, typically, from about one thousand feet to about eight thousand feet ahead of the plane.

Referring to FIG. 4, the body 15 of the rocket is formed from a tube which is annularly indented at 16 to engage a forward head 17 at the front of a motor area 18. Adjacent to the rear end a similar indentation 19 is provided for securing a nozzle head 21 to the rear end of the motor area 18. A propellent charge 22 is disposed within the motor area 18 between the heads 17 and 21. The end of the propellent charge adjacent to the head 21 has a truncated aperture 23 which extends through a central cylindrical aperture 24 to a forward truncated conical aperture 25. The walls of these apertures form burning surfaces for the propellent and controls the pressure delivered by the motor through the nozzle apertures 26 which when detonated by an electric charge ignites the propellent charge 22. The end of the body 15 adjacent to the head 21 has an outwardly extending flange 28 which slides within the sleeve 14 when telescoped thereover. The forward end of the sleeve 14 is crimped at 31 to limit the outward movement of the rocket body 15 therefrom.

The opposite end of the sleeve contains a plurality of slots 32 forming fingers 33 which are formed outwardly, having flanges 34 on the end which may be reversely flanged as at 35. The head 21 may contain an annular groove 36 into which the reversely bent flanges 35 of the fingers 33 extend when the fingers are drawn inwardly into the plane of the sleeve 14 and the rocket is moved to have the reverse flanges 35 extend within the annular groove 36. When the fingers 33 are retained in this position the sleeve 14 readily fits within a chamber 37 in a canister 38 in which any number of chambers may be provided.

The head 17 has a time fuse 40 extending therethrough with the inner end in contact with an explosive charge 39. The explosive charge is retained in position by a disc or wad 41 for separating the charge 39 from the payload 13. An ogive head 43 is releasably secured in the outer or front end of the body 15 of the rocket. It is to be understood that several types of charges could be carried as the payload of the rocket. The burning time of the time fuse 40 is longer by several seconds than the burning time for the propellent charge 22 so that the explosive charge 39 will be detonated after motor burnout.

When the rocket 12 is to be inserted in a chamber 37 with the sleeve 14 telescoped thereover and the reverse flange 35 extending into the annular groove 36, the inner end of the rocket will strike an igniter 44 and a further inward movement of the rocket will be stopped so that the sleeve can be further moved a distance to permit the reversed flanges 35 to pass out of the groove 36 and thereby permit the fingers 33 to spring outwardly into engagement with the wall of the chamber. A spring restraining device, hereinafter to be illustrated and described, extends over the ogive of the rocket and prevents the rocket from moving out of the sleeve when the canister 38 is inverted or subject to acceleration so that the rockets can be firing outwardly from the surface of the airplane. The actuation of a switch in a circuit from a power source (not shown) to the igniter 44 detonates the cap 27 and causes it to ignite the propellent charge 22 so that combustion will immediately occur upon the surfaces 23, 24 and 25 thereof. This will produce the ignition of the time fuse 40 and as the propellent charge 22 produces sufficient initial pressure, the body 15 of the rocket will start moving outwardly of the sleeve which will be retained within the chamber 37 by the force in the spring finger 33 and/or by the shear pin hereinafter to be described until the flange 28 engages the crimped end 31. By this time the ignition will be completed and the initial force of the gas out of the apertures 26 will propel the rocket with the extended sleeve out of the chamber 37 to start an outward flight. As the rocket passes through the relative airstream, the sleeve 14 will tip rearwardly to turn the rocket about its center of gravity in the area of the fuse 40 so that the rocket and sleeve will be directed parallel to the line of flight of the airplane. The rocket will be propelled to full speed and will reach a position substantially ahead of the plane at the time the fuse 40 ignites the explosive charge 39. This will eject the payload 13 a substantial distance ahead of the plane, as illustrated in FIG. 1, and as pointed out specifically herein.

One or any plurality of the rockets may be fired at a time, depending upon the number of apertures in the canister 38 and the amount of chaff, explosive power or light which may be desired by the pilot of the plane. It is to be understood that an O-ring could be provided near the mouth of the chamber 37 for initially restraining the sleeve 14 from moving with the body 15 until the fingers 33 are released. Further, an O-ring may be provided in the peripheral edge of the flange 28 to produce a desired friction between the edge of the flange and the inner wall of the sleeve. In the former case, the flanges 35 are retained in the groove 36 and the initial movement of the rocket relative to the sleeve produces the separation of the reversely bent flange 35 from the annular groove 36 to provide a further holding force for the sleeve 14 immediately after motor ignition.

In FIG. 7, a further securing means for the sleeve 14 is illustrated having a second sleeve disposed thereover and secured by one or more shear pins 46 which extend through the wall of the sleeve 45 into an aperture 47 in the sleeve 14. The sleeve 45 is disposed in an aperture 37 in the canister 38, retained therein by the overhanging edge of an aperture 48 in a plate 49 secured to the outer face of the canister by screws 50. It is to be understood that the plate will have apertures 48 therein aligned with the apertures 37 when a plurality of the sleeved rockets are retained therein. When the rocket is not otherwise retained within the sleeve 14 a spring strip 51 having its ends 52 secured in slots 53 in the plate 49 will engage the end of the ogive 43 of the rocket and releasably retain it within the sleeve. Upon firing the rocket the pressure will move it outwardly thereof and release the spring strip 51 from the slots 53. The advancement of the rocket will cause its extending flange 28 to engage the crimped edge 31 of the sleeve 14 and shear the one or the plurality of pins 46 if more than one is used. This permits the rocket with the sleeve 14 in rear extension thereof to proceed in its flight in the manner pointed out hereinabove.

We claim:

1. In a rocket, a rocket body having a motor section with a propellant charge, a sleeve telescoped over said body, engaging means between said sleeve and said body to prevent the separation of the sleeve from the body when the rocket is in flight and the sleeve is in rearward extension of the body thereof, outwardly biased fingers at the rear of the sleeve, and means for retaining the fingers drawn inwardly against the rear wall of the rocket body in the plane of the sleeve prior to the insertion of the rocket into the chamber.

2. In a rocket as recited in claim 1, wherein means are provided when moving the rocket and sleeve into firing position within said chamber to advance the sleeve over the body and release said fingers to permit them to frictionally engage the wall of the chamber.

* * * * *